(12) United States Patent
Wierstra et al.

(10) Patent No.: US 10,860,895 B2
(45) Date of Patent: Dec. 8, 2020

(54) IMAGINATION-BASED AGENT NEURAL NETWORKS

(71) Applicant: DeepMind Technologies Limited, London (GB)

(72) Inventors: Daniel Pieter Wierstra, London (GB); Yujia Li, London (GB); Razvan Pascanu, Letchworth Garden City (GB); Peter William Battaglia, London (GB); Theophane Guillaume Weber, London (GB); Lars Buesing, London (GB); David Paul Reichert, London (GB); Oriol Vinyals, London (GB); Nicolas Manfred Otto Heess, London (GB); Sebastien Henri Andre Racaniere, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/689,017

(22) Filed: Nov. 19, 2019

(65) Prior Publication Data

US 2020/0082227 A1 Mar. 12, 2020

Related U.S. Application Data

(63) Continuation of application No. PCT/EP2018/063291, filed on May 22, 2018.
(Continued)

(51) Int. Cl.
*G06K 9/62* (2006.01)
*G06K 9/68* (2006.01)
(Continued)

(52) U.S. Cl.
CPC ......... *G06K 9/6264* (2013.01); *G06K 9/6807* (2013.01); *G06N 3/08* (2013.01); *G06N 5/046* (2013.01)

(58) Field of Classification Search
CPC .................................................. G06K 9/6264
See application file for complete search history.

(56) References Cited

U.S. PATENT DOCUMENTS

2017/0286860 A1\* 10/2017 Chen .................... G06N 3/0454
2018/0032864 A1 2/2018 Graepel et al.

FOREIGN PATENT DOCUMENTS

DE 20 2016-004628 9/2016

OTHER PUBLICATIONS

David Silver, "The Predictron: End-To-End Learning and Planning," Dec. 2016, IEEE (Year: 2016).\*
(Continued)

*Primary Examiner* — Miranda M Huang
*Assistant Examiner* — Seth Andrew Raker
(74) *Attorney, Agent, or Firm* — Fish & Richardson P.C.

(57) ABSTRACT

A neural network system is proposed to select actions to be performed by an agent interacting with an environment to perform a task in an attempt to achieve a specified result. The system may include a controller to receive state data and context data, and to output action data. The system may also include an imagination module to receive the state and action data, and to output consequent state data. The system may also include a manager to receive the state data and the context data, and to output route data which defines whether the system is to execute an action or to imagine. The system may also include a memory to store the context data.

20 Claims, 3 Drawing Sheets

Related U.S. Application Data (60) Provisional application No. 62/509,040, filed on May 19, 2017.

(51) Int. Cl.
    *G06N 3/08*    (2006.01)
    *G06N 5/04*    (2006.01)

(56) References Cited

OTHER PUBLICATIONS

Andrychowicz et al., "Learning to learn by gradient descent by gradient descent," NIPS, Dec. 2016, 9 pages.
Battaglia et al., "Interaction networks for learning about objects, relations and physics," https://arxiv.org/abs/1612.00222, Dec. 2016, 12 pages.
Bengio et al., "Conditional computation in neural networks for faster models," arXiv:1511.06297, Nov. 2015, 9 pages.
Bengio, "Deep learning of representations: Looking forward," arXiv:1305.0445, Jun. 2013, 27 pages.
Coulom, "Efficient Selectivity and Backup Operators in Monte-Carlo Tree Search," International Conference on Computers and Games, 2006, 72-83.
Finn et al., "Deep visual foresight for planning robot motion," IEEE International Conference on Robotics and Automation (ICRA), May 2017, 8 pages.
Fragkiadaki et al., "Learning Visual Predictive Models of Physics for Playing Billiards," Proceedings of the International Conference on Learning Representations (ICLR 2016), Jan. 2016, 12 pages.
Graves, "Adaptive Computation Time for Recurrent Neural Networks," https://arxiv.org/abs/1603.08983v4, Apr. 2016, 19 pages.
Hamrick et al., "Metacontrol for Adaptive Imagination-Based Optimization," arXiv:1705.02670, May 2017, 21 pages.
Hay et al., "Selecting Computations: Theory and Applications," Proceedings of the 28th Conference on Uncertainty in Artificial Intelligence, Aug. 2012, 10 pages.
Heess et al., "Learning continuous control policies by stochastic value gradients," https://arxiv.org/abs/1510.09142, Oct. 2015, 13 pages.
Hochreiter et al., "Long short-term memory," Neural computation, Nov. 1997, 9(8): 1735-1780.
Horvitz, "Reasoning About Beliefs and Actions Under Computational Resource Constraints," Proceedings of the Third Conference on Uncertainty in Artificial Intelligence, Jul. 1987, 19 pages.
Hren et al., "Optimistic planning of deterministic systems," European Workshop on Reinforcement Learning, Jun. 2008, 15 pages.
Kingma et al., "Adam: A Method for Stochastic Optimization," https://arxiv.org/abs/1412.6980v1, Dec. 2014, 9 pages.
Lenz et al., "DeepMPC: Learning deep latent features for model predictive control," Robotics: Science and Systems, Jul. 2015, 9 pages.
Munos, "Optimistic optimization of a deterministic function without the knowledge of its smoothness," Advances in Neural Information Processing Systems, Dec. 2011, 10 pages.
Pascanu et al., "Learning model-based planning from scratch," https://arxiv.org/abs/1707.06170, Jul. 2017, 13 pages.
PCT International Preliminary Report on Patentability in International Appln. No. PCT/EP2018/063291, dated Nov. 19, 2019, 11 pages.
PCT International Search Report and Written Opinion in International Appln. No. PCT/EP2018/063291, dated Aug. 10, 2018, 18 pages.
Russell et al., "Principles of Metareasoning," Artificial Intelligence, May 1991, 49:361-395.
Silver et al., "Mastering the game of Go with deep neural networks and tree search," Nature, Jan. 2016, 529:484-489.
Silver et al., "The predictron: End-to-end learning and planning," arXiv preprint arXiv:1612.08810, Dec. 2016, 11 pages.
Sutton, "Dyna, an integrated architecture for learning, planning, and reacting," ACM SIGART Bulletin, Jul. 1991, 4 pages.
Tamar et al., "Value Iteration Networks," NIPS, Dec. 2016, 9 pages.
Vezhnevets et al., "Strategic attentive writer for learning macro-actions," arXiv preprint arXiv:1606.04695, Jun. 2016, 10 pages.
Watter et al., "Embed to control: A locally linear latent dynamics model for control from raw images," NIPS, Dec. 2015, 9 pages.
Weber et al., "Imagination-Augmented Agents for Deep Reinforcement Learning," https://arxiv.org/abs/1707.06203v1, Jul. 2017, 19 pages.
Weinstein et al., "Bandit-Based Planning and Learning in Continuous-Action Markov Decision Processes," Proceedings of the Twenty-Second International Conference on Automated Planning and Scheduling, May 2012, 306-314.
Williams, "Simple statistical gradient-following algorithms for connectionist reinforcement learning," Machine Learning, 1992, 8(3-4): 229-256.

\* cited by examiner

IMAGINATION-BASED AGENT NEURAL NETWORKS

CROSS-REFERENCE TO RELATED APPLICATIONS

This application is a continuation of and claims priority to PCT Application No. PCT/EP2018/063291, filed on May 22, 2018, which claims priority to U.S. Provisional Application No. 62/509,040, filed on May 19, 2017. The disclosures of the prior applications are considered part of and are incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a reinforcement learning system that selects actions to be performed by a reinforcement learning agent interacting with an environment. In order for the agent to interact with the environment, the system receives data characterizing the current state of the environment and selects an action to be performed by the agent in response to the received data. Data characterizing a state of the environment will be referred to in this specification as an observation.

In some implementations, the environment is a simulated environment and the agent is implemented as one or more computer programs interacting with the simulated environment. For example, the simulated environment may be a video game and the agent may be a simulated user playing the video game. As another example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle. More generally the environment may be one in which a robotic control task is performed.

Thus in some other implementations, the environment is a real-world environment and the agent is a mechanical agent interacting with the real-world environment. For example, the agent may be a robot interacting with the environment to accomplish a specific task. As another example, the agent may be an autonomous or semi-autonomous vehicle navigating through the environment. In these implementations, the actions may be control inputs to control the robot or the autonomous vehicle.

In one aspect, this disclosure proposes a neural network system for task learning used to select actions to be performed by an agent interacting with an environment to perform a task in an attempt to achieve a specified result. The system may include a controller neural network module to receive state data, for example a state vector, and context data, and to output action data. The state data may characterize a real or imagined state of the environment. The context data defines a context for planning actions and/or proposed actions. The action data defines a real or imagined action to be performed on the environment or on an imagined version of the environment.

The system may also include a model neural network module (also called here "an imagination") to receive the state and action data and to output consequent state data. The consequent state data defines a state consequent upon an action defined by the action data. The model neural network module may also output reward data defining a modelled reward.

The system may also include a manager network module to receive the state data and the context data and to output route data. The route data may define whether the system is to execute an action or to imagine. "Imagine" means generating consequent state data for one or more consequent states (that is, states of the environment which are predictions of a result from the agent taking specific actions proposed by the controller) and optionally other parameters such as reward data describing rewards associated with the consequent states.

The system may also include a memory to store the context data. In implementations the context data may be derived from at least the state data or the consequent state data, action data for a real and/or imagined action, and from the reward data. For example the context data may be an embedding of these data. The context data may also be derived from previous context data. The context data may further be derived from auxiliary data such as a number of actions taken, a number of imagination rollouts performed, and the like. The memory may comprise a sequential state generation neural network such as a LSTM (Long Short Term Memory) neural network.

When the route data defines that the system is to imagine, state data for an imagined state (denoted later in this document as $\hat{s}_{j,k}$, where j is a step index which indicates the most recent time for which the neural network system has received state data, $s_j$, and k indicates a number of iterations (imagination steps) which the neural network system has used to produce $\hat{s}_{j,k}$ using $s_j$) may be provided to the controller neural network module to generate imagined action data. The imagined action data and the state data may be provided to the model neural network module. The model neural network module may then generate imagined consequent state data. Context data may be derived using the consequent state data, for example for storage in the memory.

The state data may comprise state data for a current action step, for example an action having a step index j. Thus in one example the state data may be data for state j (initially the imagined state may be reset to state j). One-step imagination may be employed and the predicted consequent state from the model may be used to update the imagined state to the next step. In another example the state data provided to said controller neural network module comprises imagined state data for an imagined state k action steps ahead of a current action step. Optionally the manager network module may build an imagination tree by additionally determining one or more previous imagined states from which imagination is to proceed.

A method of training the system may involve separately training the model neural network module, and the manager network module, and jointly training the controller neural network module and memory. The training may be based upon a loss function include a term representing a computational cost of imagining using the system.

The subject matter described in this specification can be implemented in particular embodiments so as to realize one or more of the following advantages. The system can be used for continuous control applications where there is no finite search tree to consider. The system, in particular the manager module, can learn to decide whether the agent should keep planning by imagining actions or if it is ready to act, and optionally can also decide from which state to imagine. Both these abilities contribute to achieving good performance efficiently. Experimentally, we observed a clear advantage, with a uniform increase in rewards achieved by the agent from taking a fixed number of actions, with an increasing number of imagination steps.

The system can be used on almost any model which can be run forwards and is differentiable so that a policy gradient can be computed. This includes real-world control problems, such as controlling complex, non-linear dynamical systems. One class of problems for which this system has been found to be successful is those in which the agent is an autonomous or semi-autonomous vehicle navigating through the environment. In still other examples the real-world environment may be a manufacturing plant or service facility, the observations may relate to operation of the plant or facility, for example to resource usage such as power consumption, and the agent may control actions or operations in the plant/facility, for example to reduce resource usage.

The system can better distinguish between similar observed states by using the model to roll out forwards to distinguish between the effects of actions. It can also improve handling of examples (states) which are different to those encountered during its training. More particularly the ability to learn faster may reduce the amount of training data, and hence memory requirements, needed to achieve a given level of performance. As a corollary, the described systems may also require reduced computing resources to achieve a given level of performance, since this may be achieved with less training than with previous techniques Implementations of the system can also strike a balance between the computational cost of imagining and external task performance.

BRIEF DESCRIPTION OF THE DRAWINGS

Like reference numbers and designations in the various drawings indicate like elements.

DETAILED DESCRIPTION

This specification generally describes a reinforcement learning system implemented as computer programs on one or more computers in one or more locations that selects actions to be performed by a reinforcement learning agent interacting with an environment by using a neural network. This specification also describes how such a system can adjust the parameters of the neural network.

The system has an advantage that an agent such as a robot, or autonomous or semi-autonomous vehicle can improve its interaction with a simulated or real-world environment. It can enable for example the accomplishment of a specific task or improvement of navigation through or interaction with the environment.

In order to interact with the environment, the agent receives data characterizing the current state of the environment and performs an action from an action space, i.e., a discrete action space or continuous action space, in response to the received data. Data characterizing a state of the environment will be referred to in this specification as an observation.

In some implementations the environment is a simulated environment and the agent is implemented as one or more computers interacting with the simulated environment. For example the simulated environment may be a video game and the agent may be a simulated user playing the video game.

In other implementations the environment is a real-world environment and the agent is a mechanical agent interacting with the real-world environment. For example, the agent may be a robot interacting with the environment to accomplish a specific task or an autonomous or semi-autonomous vehicle navigating through the environment. In these cases the observation can be data captured by one or more sensors of the agent as it interacts with the environment, e.g., a camera, a LIDAR sensor, a temperature sensor, and so forth.

Figure 1:
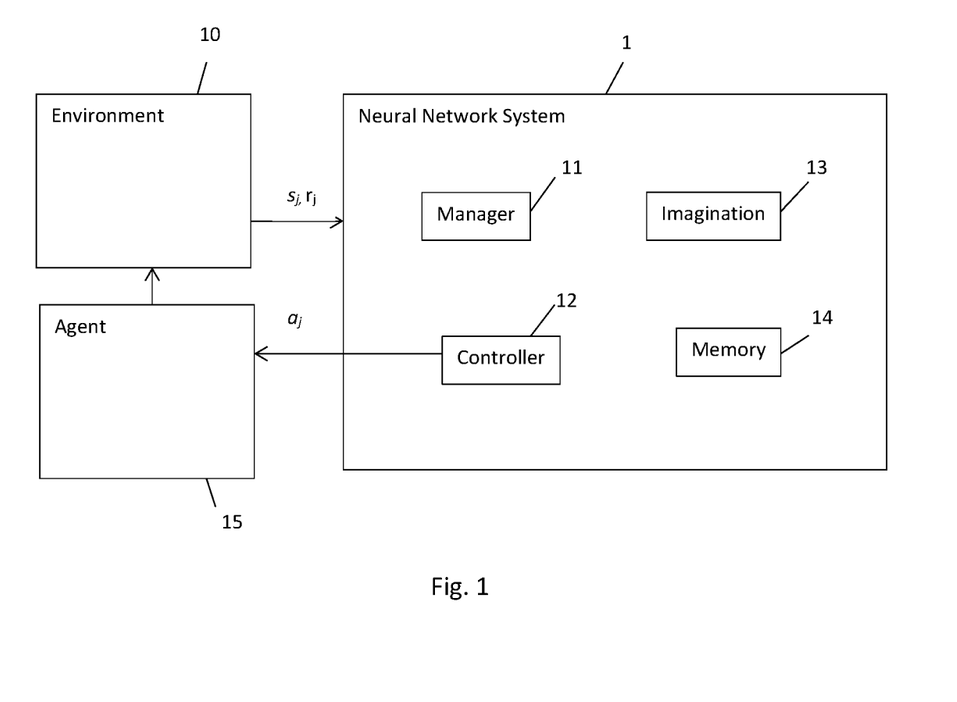
FIG. 1 shows a neural network system, and its interaction with an agent and an environment.

FIG. 1 illustrates an example of a neural network system 1 as proposed in the present disclosure. The neural network system 1 is for controlling an agent 15 which is acts on (or within) an environment 10. The neural network system 1 receives, at any time j a dataset $s_j$ which is an observation of the system, and is referred to as "state data". The neural network system 1 generates an action $a_j$ and transmits it as a command to the agent 15, which acts on the environment 10 and thereby obtains a reward $r_j$ which is also communicated to the neural network system 1.

The neural network system 1 includes four major components: a manager network module 11 (a "manager"), a controller neural network module 12 (a "controller"), an imagination 13 (also referred to here as a "model neural network module", since it functions as a model of the environment 10) and a memory 14.

The neural network system 1 determines $a_j$ by performing an iterative process (illustrated in FIG. 2, and explained in more detail below) having a number of steps. In each step, the manager 11 determines whether to act (i.e. generate action data to define an action by the agent 15, and transmit the action data to the agent 15 so that the action is executed), or "imagine" (by which is meant proposing an action and evaluating consequences of the action). Depending on this determination, the manager 11 outputs route data, which defines whether the system is to execute the action, or to imagine. If the manager 11 determines that the system should act, the controller 12 produces the action data, and transmits it to the agent 15, so that it is executed in the environment 10. If the manager 11 determines that the system should imagine, the controller 12 produces action data defining an action which is evaluated by the model-based imagination 13. In both cases, data resulting from each step are aggregated by the memory 14 and used to influence future actions. Thus, the collective activity of the components of the neural network system 1 supports various strategies for constructing, evaluating, and executing a plan.

The iterations of the iterative process are labelled by an integer index i, which is assumed below to run from 0. The sequence of imagination steps the neural network system 1 performs before an action, are indexed by integer index k. During the iterative process, two types of data are generated: external data and internal data. The external data includes the observed states of the environment, $s_j$, executed actions, $a_j$, and obtained rewards, $r_j$. The internal data includes: imagined states of the environment generated by the imagination 13, which are denoted by $\hat{s}_{j,k}$ (that is, the k-th state which is imagined when the neural network system 1 determines how to generate action data in response to the state $s_j$); actions which are proposed by the controller 12, which are denoted by $\hat{a}_{j,k}$; and rewards predicted by the imagination 13, which are denoted by $\hat{r}_{j,k}$. The internal data further comprises the route data which depends upon manager's decision about whether to act or imagine (and, optionally, how to imagine), and which is denoted $p_{j,k}$. The internal data further includes data defining the number of actions and imaginations which have been performed, and all other auxiliary information from each step. We denote the external and internal data for a single iteration i as $d_i$, and the history of all external and internal data up to, and including, the present iteration as, $h_i=(d_0, \ldots, d_i)$. The set of all imagined states since the previous executed action is thus $\{\hat{s}_{j,0}, \ldots, \hat{s}_{j,k}\}$, where $\hat{s}_{j,0}$ is initialized as the current state $s_j$ of the environment 10.

We now define the operation of the components of the neural network system 1 more precisely.

The manager 11 is a discrete policy which maps a history h obtained from the memory 14 to the route data p. We can denote the space of all possible histories as $\mathcal{H}$, and so that $h \in \mathcal{H}$. Similarly, we can denote the space of all possible route data as $\mathcal{P}$, so that $p \in \mathcal{P}$. Thus, the manager 11 performs the function $\pi^M: \mathcal{H} \to \mathcal{P}$. The route data p determines whether the agent will execute an action in the environment, or imagine the consequences of a proposed action.

Figure 3:
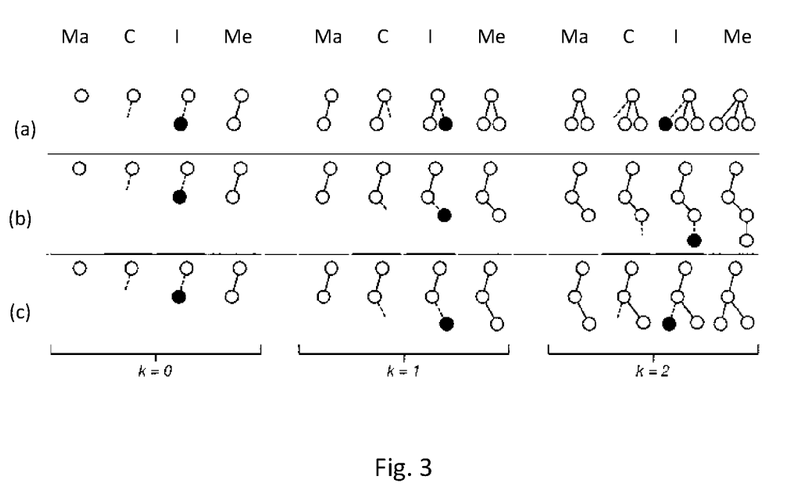
FIG. 3, which is composed of FIGS. 3(*a*) to 3(*c*), shows three imagination strategies used by the neural network system.

As described below with reference to FIG. 3, in the case of imagining, the route data may also define which state (which may be the real state $s_j$ or a previously imagined state) should be the starting point of the imagination (i.e. the state in relation to which the consequences of a proposed action are predicted) to imagine from. Thus, the route data may be $p_{j,k} \in \{act, \hat{s}_{j,0}, \ldots, \hat{s}_{j,k}\}$, where "act" is the signal to generate action data to execute an action in the environment 10, and if $p_{j,k}$ does not take this value it instead takes a value $\hat{s}_{j,l}$ which is one of $\{\hat{s}_{j,0}, \ldots, \hat{s}_{j,k}\}$ and which is a signal to propose and evaluate an action from imagined state, $\hat{s}_{j,l}$. As described below (with reference to FIG. 3) there are various ways in which $\hat{s}_{j,l}$ can be determined by the manager 11. In one example, the manager 11 may be implemented as a multi-layer perceptron (MLP). In another example (particularly when the state data s is a two-dimensional array of values) the manager 11 may be convolutional network (i.e. a network including at least one convolutional layer).

The controller 12 is a contextualized action policy which maps a state s (which is member of the set S of all possible states of the environment 10) and a history h, to an action, a which is a member of the set of all possible actions, denoted A. Thus, the manager 12 performs the function $\pi^C: S \times \mathcal{H} \to A$. The states which is provided as input to the controller 12 is in accordance with the route data p output by the manager 11. If the route data p indicates that an action is to be executed, the state provided to the controller 12 is $s_j$. However, if the route data p indicates that an imagining process should be carried out, the input to the controller 11 is $\hat{s}_{j,l}$. In one example, the controller 12 may be implemented as a MLP.

The imagination 13 is an adaptive model of the world. It maps a state s (where $s \in S$), and an action a (where $a \in A$), to a consequent state, $s' \in S$, and a scalar reward, r which is a member of a set of possible rewards R. Thus, the imagination 12 performs the function I: $S \times A \to S \times R$. Examples of possible forms of the imagination 12 are given below.

The memory 14 is also an adaptive system, such as a long-short-term-memory (LSTM). It recurrently aggregates the external and internal data $d_i$ generated from each iteration i (where $d_i$ is a member of the set D of all possible data), to update the history, i.e. $h_i = \mu(d_i, h_{i-1})$, where $\mu$ is a trained adaptive function.

Figure 2:
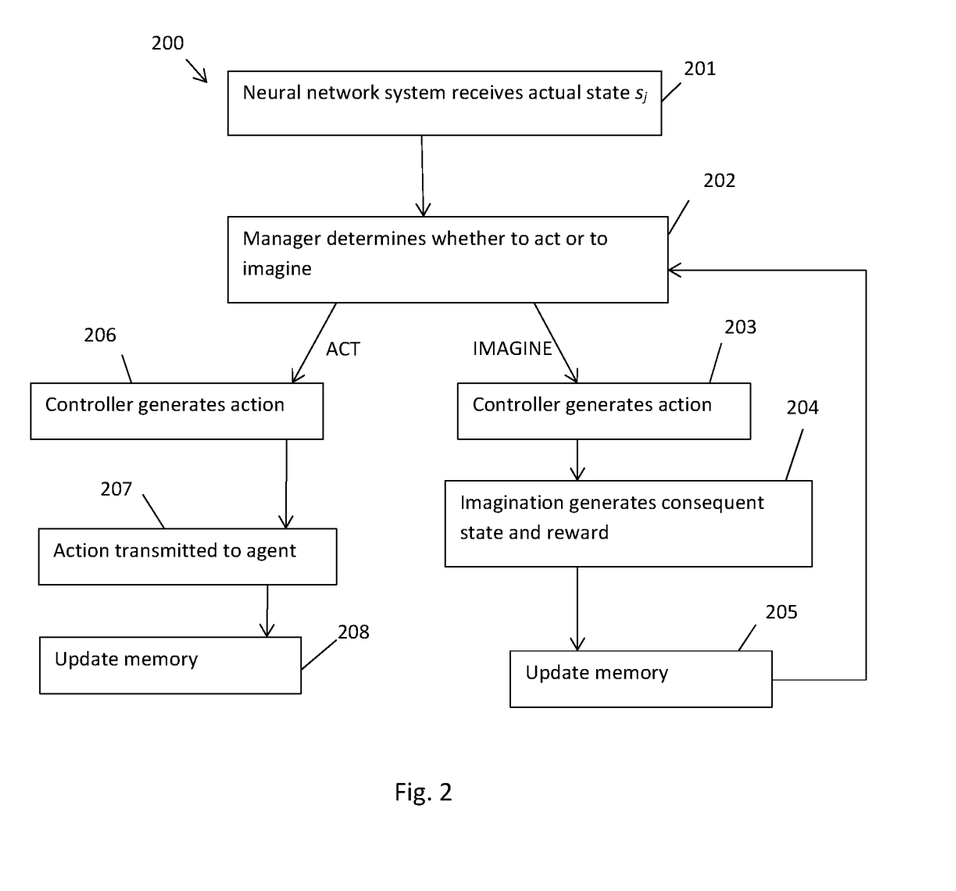
FIG. 2 shows a method performed by the neural network system.

The method 200 performed by the neural network system 1 for a given value of j is illustrated in FIG. 2.

In step 201, the neural network system 1 receives an actual data state $s_j$. At this time the integer value k is equal to zero.

In step 202, the manager 11 receives the data state $s_j$ and also data from the memory 14. The manager 11 determines whether to execute an action, or to imagine, and generates corresponding route data.

If the result of the determination was to imagine, the neural network system 1 passes to step 203, in which the controller 12 uses state data and the context data to generate an action $\hat{a}_{j,k}$.

In step 204, the imagination 13 receives the same state data and the action $\hat{a}_{j,k}$, and generates from them a consequent state, $s' \in S$, and a scalar reward, $\hat{r}_{j,k}$.

In step 205, the memory 14 is updated, and used to generate a new output $h_i$. The variable k is set to k+1. The method then returns to step 202. This loop of steps 202-2025 may be carried out any number of times.

However, if in step 202, the route data indicates that an action is to be executed, the method 200 passes to step 206 in which the controller generates the action $a_j$. In step 207 the action is transmitted to the agent 15 which acts on the system 10, and obtains a reward $r_j$. In step 208, the memory 14 is updated to include the external and internal data and the method then terminates. It is repeated later for the next value of j, and this process continues until a termination condition is reached.

In summary, the method of constructing a plan involves the neural network system 1 choosing to propose actions and imagine consequences of the actions, and thereby build up a record of possible sequences of actions' expected quality. If a sequence of actions predicted to yield a high reward is identified, the manager 11 can then choose to act and the controller 12 can produce the appropriate actions.

Note that in variations of the embodiment, the method 200 may be varied, e.g., such that the controller 12 proposes an action at the same time as (or before) the manager 11 decides whether to act, so that the route data is used to determine whether the previously generated action is executed or used by the imagination 13.

There are various possibilities for how to choose the state data s on which the controller 12 and imagination 13 operate in steps 203 and 204. A first possibility (the "one-step" possibility) is for the controller 12 and the imagination 13 always to operate based on $s_j$. Note that as the controller may be such as to generate a proposed action as a sample from a distribution, so that in different iterations k, the action $\hat{a}_{j,k}$ is different. This strategy is illustrated in row (a) of FIG. 3. In FIG. 3, the circles indicate states of the environment. Lines extending down from a circle indicate an action proposed for that state by the controller 12. A circle at the lower end of such a line indicates the imagined consequent state. Such a circle is shown with a dark center (as a "dark circle") until it is stored in the memory 14. Once this happens, the circle is shown without a dark centre (a "light circle"). Similarly, a proposed action is shown as a dashed line until it is stored in the memory 14, and then it is shown as a solid line.

Thus, for the "one step" possibility (the row (a)), the k=0 iteration begins with a single state $s_j$ (indicated as a light circle) which the manager ("Ma" in FIG. 3) indicates should be the basis for imagination. An action for this state is proposed by the controller 12 ("C"), to give a circle plus a downwardly extending dashed line. The imagination 13 ("I") then proposes a state, indicated as a dark circle below the dashed line. The state and line are then saved to the memory 14 ("Me"), so that the line is shown as a solid line, and the state is shown as a light circle.

In the "one step" possibility, the k=1 and k=2 iterations of row (a) each also begin from the state $s_j$ used as the starting point in the iteration k=0: a downwardly extending dashed line is added representing a new action proposed by the controller 12; then a state (dark circle) is added to the lower end of the dashed line, indicating a state predicted by the imagination 12 if the action is implemented; and then the state and action are stored in the memory (the imaged state is now shown as a light circle, and the new action is shown as a solid line).

A second possibility (the "n step" strategy) is for the state data s on which the controller 12 and imagination 13 operate in steps 203 and 204 to be chosen as $s_j$ in iteration k=0, and subsequent iterations to be set as $\hat{s}_{j,k-1}$, i.e. the state output by the imagination 13 at the preceding iteration. The "n step" planning strategy is illustrated in row (b) of FIG. 3. The k=0 iteration is the same as in row (a). The k=1 iteration is different, in that the circle representing the state imagined in iteration k=0, is the starting point for the addition of a downwardly extending dashed line, and then a circle. Similarly, in the k=2 iteration is different, in that the circle representing the state imagined in iteration k=1, is the starting point for the addition of a downwardly extending dashed line, and then a circle. More generally, the state imagined in the n-th iteration will be one which is $s_j$ after it has been subject to n actions. Note that after k iterations, the imagination 13 has generated a consequent state $\hat{s}_{j,k}$ which is k steps after j, so that if step 206 is performed at this point the controller has available to it a plan which extends for k steps into the future.

A third possibility (referred to as the "tree" strategy) is for the manager 11 to specify, in each iteration, which of the previously considered states is to be used as the starting point for the controller 12 in step 203 of the k-th iteration, and the imagination 13 in step 204 of the k-th iteration. The tree strategy is illustrated in row (c) of FIG. 3. Note that in the k=0 iteration, there is only one possibility $s_j$ for the state data to input to the controller 12 and imagination 13, so the manager 11 has no option but to choose it. Thus, the k=0 iteration is the same as the "one step" and "n step" strategies. In the k=1 iteration the manager 11 determines that the state generated in the k=0 iteration is to be input to the controller 12 and imagination 13, so the k=1 iteration happens to be the same as for the n step strategy. However, in the k=2 iteration the manager 11 determines that the state generated in the k=0 iteration is again to be input to the controller 12 and imagination 13, so in row (c) of FIG. 3 this state is shown at the end of the k=2 iteration as having two states beneath it, connected to it by lines. More generally, in the tree strategy, there is an "imagination tree" (in contrast, for example, to the array of states produced at the right hand end of row (b), which is just a chain of states), because imagined actions can be proposed from any previously imagined state.

Experiments using the neural network system 1 were performed in relation to a continuous control task, in which the parameters of the environment were defined by real numbers. The memory, 14, was an long short-term memory (LSTM) which performed a function $\mu$. In this implementation, the memory 14 was used, at each iteration i, to produce a context $c_i$ which was used, in place of the full history, as the input to the manager 11 and the controller 12. That is, the memory 14 is arranged to output a function $\mu$ of arguments which comprise a portion of the internal and/or external data, and subset of the data stored in the memory, such as a function of a portion of the internal and/or external data for the last iteration and an output of the memory 14 in the last iteration. This is a generalization of the function of the memory 14 explained above. Specifically, for imaging, the memory 14 was arranged to output $c_i$ as a function $\mu(p_{j,k}, s_j, \hat{s}_{j,p_k}, \hat{a}_{j,k}, \hat{s}_{j,k+1}, \hat{r}_{j,k}, j, k, c_{i-1})$. For acting, the memory 14 was arranged to output a function $\mu(p_{j,k}, s_j, \hat{s}_{j,0}, a_j, s_{j+1}, r_j, j, k, c_{i-1})$. The manager 11 and controller 12 were multi-layer perceptrons (MLP). The manager took $s_j$ and $c_{i-1}$ as inputs, and outputted $p_{j,k}$. The controller 11 took $\hat{s}_{j,p_k}$ and $c_{i-1}$ as inputs, and outputted $a_{j,k}$ or $a_j$, for imagining or acting, respectively. The imagination 13 (i.e. imagination-based model of the environment) was an interaction network (see Peter Battaglia, Razvan Pascanu, Matthew Lai, Danilo Jimenez Rezende, et al., "Interaction networks for learning about objects, relations and physics", in *Advances in Neural Information Processing Systems* pages 4502-4510, 2016) which is known to be able to learn to predict gravitational system dynamics accurately. For acting, it took as inputs $\hat{s}_{j,k}$ and $\hat{a}_{j,k}$ and returned $\hat{s}_{j,k+1}$ for imagining, and for acting it took as inputs $s_j$ and $a_j$ and returned $s_{j+1}$ for acting.

In an experiment, the neural network system 1 was trained by jointly optimizing a cost function comprising two loss terms: an external term (termed performance loss) and an internal term (called resource loss) term. The performance loss term reflects a cost, in the environment chosen, of executing an action in the environment 10. The resource loss term reflects the cost of using the imagination in a particular time step. It may be fixed, or vary with the number of actions taken so far, expressing the constraint that imagining early is more or less expensive than imagining on-the-fly. The training consisted of optimizing, by gradient descent, the parameters of the neural network system to jointly minimize the performance loss term and the resource loss term. Where gradients of the terms were not directly available, approximation methods were used to estimate them.

Figure 4:
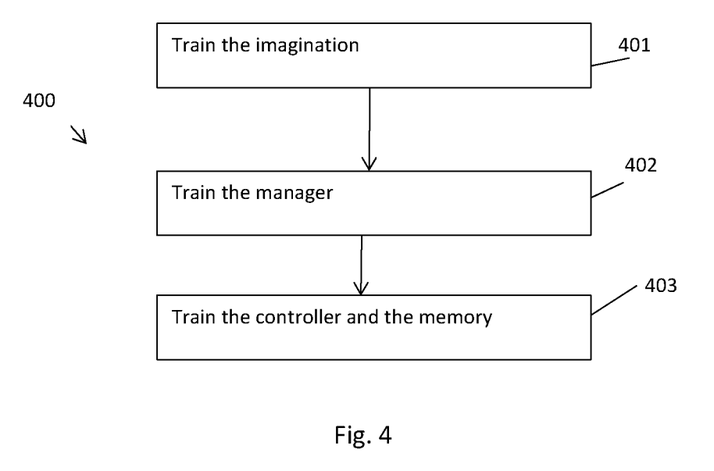
FIG. 4 shows a method for training the neural network system.

The training method is shown in FIG. 4. In step 401 the imagination 13 was taught to make next-step predictions of the state in a supervised fashion, with error gradients computed by backpropagation. The training data is collected from the observations the agent makes when acting in the environment 10. The policy of the imagination 13 in this case was stochastic, so an entropy reward was used during training to encourage exploration. In step 402, the manager 11 was trained. In step 403, the controller 12 and the memory 14 were jointly trained. Note that steps 401, 402 and 403 are independent, so they can be performed in any order or simultaneously.

In our experiments for other tasks (e.g. tasks for which the environment does not have continuous parameters) the structure of the imagination 13 was chosen differently, and the training was not as shown in FIG. 4.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising one or more computers and one or more storage devices storing instructions that when executed by the one or more computers cause the one or more computers to perform operations for controlling an agent to perform a specified task in an environment, the operations comprising:
    maintaining context data defining a context for planning actions to be performed by the agent;
    receiving current state data characterizing a current state of the environment;
    until determining to act in the environment in response to the current state data, performing iterations of an imagining process to imagine consequences of performing actions in the environment, wherein performing each iteration of the imagining process comprising:
        selecting input state data for the iteration;
        processing the input state data for the iteration and the context data using a controller neural network configured to process the input state data and the context data and to output action data defining an action to be performed by the agent when the environment is in a state defined by the input state data;
        processing the input state data and the action data using a model neural network configured to process the input state data and the action data to (i) generate predicted state data that characterizes a predicted state that the environment transitions into consequent upon the action defined by the action data being performed while the environment is in the state defined by the input state data and (ii) generate a predicted reward that is a prediction of a reward that would be received consequent upon the action defined by the action data being performed while the environment is in the state defined by the input state data;
        updating, using at least the predicted state data and the predicted reward for the iteration, the context data; and
        determining whether to (i) act in the environment or (ii) perform another iteration of the imagining process; and
    after determining to act in the environment, selecting an action to be performed by the agent in response to the current state data using the current state data and the context data after a last iteration of the imagining process.

2. The system of claim 1, wherein for a first iteration of the imagining process selecting the input state comprises selecting the current state data as the input state data for the iteration.

3. The system of claim 2, wherein for any iteration of the imagining process after the first iteration, selecting the input state comprises selecting the predicted state generated at the preceding iteration of the imagining process as the input state at the iteration.

4. The system of claim 2, wherein for any iteration of the imagining process after the first iteration, selecting the input state comprises selecting the input state for the iteration from at least the predicted state generated at the preceding iteration of the imagining process and the current state data.

5. The system of claim 1, wherein updating, using at least the predicted state data and the predicted reward for the iteration, the context data comprises:
    generating, from at least the predicted state data for the iteration, the predicted reward for the iteration, and the context data, an input to a memory neural network; and processing the input using the memory neural network, wherein the memory is configured to generate, as output, updated context data.

6. The system of claim 5, wherein the memory neural network is a long short-term memory (LSTM) neural network.

7. The system of claim 1, wherein determining whether to (i) act in the environment or (ii) perform another iteration of the imagining process comprises determining whether to (i) act in the environment or (ii) perform another iteration of the imagining process based on at least the context data after the updating of the context data.

8. The system of claim 7, wherein determining whether to (i) act in the environment or (ii) perform another iteration of the imagining process comprises:
  processing an input comprising the context data after the updating of the context data using a manager neural network configured to process the input using a manager neural network configured to generate as output route data that defines whether to (i) act in the environment or (ii) perform another iteration of the imagining process.

9. The system of claim 8, wherein, when the route data further defines the state data that is selected as the input state data at the another iteration of the imagining process.

10. The system of claim 8, the operations further comprising:
  prior to performing any iterations of the imagining process, processing an input comprising the context data prior to performing any iterations of the imagining process using the manager neural network to generate initial route data that defines whether to (i) act in the environment or (ii) perform any iterations of the imagining process; and
  performing iterations of the imagining process to imagine consequences of performing actions in the environment only in response to the initial route data defining to perform iterations of the imagining process.

11. The system of claim 1, wherein after determining to act in the environment, selecting an action to be performed by the agent in response to the current state data using the current state data and the context data after a last iteration of the imagining process comprises
  processing the current state data and the context data after the last iteration of the imagining process using the controller neural network configured to generate current action data; and
  causing the agent to perform the action that is defined by the current action data in the environment.

12. The system of claim 1, the operations further comprising:
  receiving next state data characterizing a next state that the environment transitioned into as a consequence of the agent performing the selected action;
  receiving an external reward as a consequence of the agent performing the selected action; and
  updating the context data using at least the next state data and the external reward.

13. A method performed by one or more computers and for controlling an agent to perform a specified task in an environment, the operations comprising:
  maintaining context data defining a context for planning actions to be performed by the agent;
  receiving current state data characterizing a current state of the environment;
  until determining to act in the environment in response to the current state data, performing iterations of an imagining process to imagine consequences of performing actions in the environment, wherein performing each iteration of the imagining process comprising:
    selecting input state data for the iteration;
    processing the input state data for the iteration and the context data using a controller neural network configured to process the input state data and the context data and to output action data defining an action to be performed by the agent when the environment is in a state defined by the input state data;
    processing the input state data and the action data using a model neural network configured to process the input state data and the action data to (i) generate predicted state data that characterizes a predicted state that the environment transitions into consequent upon the action defined by the action data being performed while the environment is in the state defined by the input state data and (ii) generate a predicted reward that is a prediction of a reward that would be received consequent upon the action defined by the action data being performed while the environment is in the state defined by the input state data;
    updating, using at least the predicted state data and the predicted reward for the iteration, the context data; and
    determining whether to (i) act in the environment or (ii) perform another iteration of the imagining process; and
  after determining to act in the environment, selecting an action to be performed by the agent in response to the current state data using the current state data and the context data after a last iteration of the imagining process.

14. The method of claim 13, wherein updating, using at least the predicted state data and the predicted reward for the iteration, the context data comprises:
  generating, from at least the predicted state data for the iteration, the predicted reward for the iteration, and the context data, an input to a memory neural network; and
  processing the input using the memory neural network, wherein the memory is configured to generate, as output, updated context data.

15. The method of claim 13, wherein determining whether to (i) act in the environment or (ii) perform another iteration of the imagining process comprises determining whether to (i) act in the environment or (ii) perform another iteration of the imagining process based on at least the context data after the updating of the context data.

16. The method of claim 15, wherein determining whether to (i) act in the environment or (ii) perform another iteration of the imagining process comprises:
  processing an input comprising the context data after the updating of the context data using a manager neural network configured to process the input using a manager neural network configured to generate as output route data that defines whether to (i) act in the environment or (ii) perform another iteration of the imagining process.

17. The method of claim 16, wherein, when the route data further defines the state data that is selected as the input state data at the another iteration of the imagining process.

18. The method of claim 16, further comprising:
  prior to performing any iterations of the imagining process, processing an input comprising the context data prior to performing any iterations of the imagining process using the manager neural network to generate initial route data that defines whether to (i) act in the environment or (ii) perform any iterations of the imagining process; and performing iterations of the imagining process to imagine consequences of performing actions in the environment only in response to the initial route data defining to perform iterations of the imagining process.

19. The method of claim 13, wherein after determining to act in the environment, selecting an action to be performed by the agent in response to the current state data using the current state data and the context data after a last iteration of the imagining process comprises processing the current state data and the context data after the last iteration of the imagining process using the controller neural network configured to generate current action data; and causing the agent to perform the action that is defined by the current action data in the environment.

20. One or more non-transitory computer-readable storage media storing instructions that when executed by one or more computers cause the one or more computers to perform operations for controlling an agent to perform a specified task in an environment, the operations comprising:

maintaining context data defining a context for planning actions to be performed by the agent;

receiving current state data characterizing a current state of the environment;

until determining to act in the environment in response to the current state data, performing iterations of an imagining process to imagine consequences of performing actions in the environment, wherein performing each iteration of the imagining process comprising:

selecting input state data for the iteration;

processing the input state data for the iteration and the context data using a controller neural network configured to process the input state data and the context data and to output action data defining an action to be performed by the agent when the environment is in a state defined by the input state data;

processing the input state data and the action data using a model neural network configured to process the input state data and the action data to (i) generate predicted state data that characterizes a predicted state that the environment transitions into consequent upon the action defined by the action data being performed while the environment is in the state defined by the input state data and (ii) generate a predicted reward that is a prediction of a reward that would be received consequent upon the action defined by the action data being performed while the environment is in the state defined by the input state data;

updating, using at least the predicted state data and the predicted reward for the iteration, the context data; and determining whether to (i) act in the environment or (ii) perform another iteration of the imagining process; and after determining to act in the environment, selecting an action to be performed by the agent in response to the current state data using the current state data and the context data after a last iteration of the imagining process.

* * * * *